US010175769B2

(12) United States Patent
Lai et al.

(10) Patent No.: US 10,175,769 B2
(45) Date of Patent: Jan. 8, 2019

(54) INTERACTIVE SYSTEM AND GLASSES WITH GESTURE RECOGNITION FUNCTION

(71) Applicant: PixArt Imaging Inc., Hsin-Chu County (TW)

(72) Inventors: Horng-Goung Lai, Hsin-Chu County (TW); En-Feng Hsu, Hsin-Chu County (TW); Meng-Huan Hsieh, Hsin-Chu County (TW); Yu-Hao Huang, Hsin-Chu County (TW); Nien-Tse Chen, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 15/854,498

(22) Filed: Dec. 26, 2017

(65) Prior Publication Data
US 2018/0120949 A1 May 3, 2018

Related U.S. Application Data

(63) Continuation of application No. 13/929,061, filed on Jun. 27, 2013, now Pat. No. 9,904,369.

(30) Foreign Application Priority Data

Jul. 6, 2012 (TW) .............. 101124573 A

(51) Int. Cl.
H04N 7/18 (2006.01)
H04N 9/47 (2006.01)
G06F 3/01 (2006.01)
H04N 21/4223 (2011.01)
G06F 3/03 (2006.01)

(52) U.S. Cl.
CPC ............ G06F 3/017 (2013.01); G06F 3/0304 (2013.01); H04N 7/188 (2013.01); H04N 21/4223 (2013.01)

(58) Field of Classification Search
None
See application file for complete search history.

(56) References Cited

U.S. PATENT DOCUMENTS 5,594,469 A 1/1997 Freeman et al.
8,179,604 B1* 5/2012 Prada Gomez .... G02B 27/0093
345/8
8,552,983 B2* 10/2013 Chiu ....................... G06F 3/017
345/166
8,761,437 B2* 6/2014 Kirovski ................. A63F 13/42
382/103

(Continued)

FOREIGN PATENT DOCUMENTS

CN 101258436 A 9/2008
CN 101777250 A 7/2010

(Continued)

Primary Examiner — Talha M Nawaz
(74) Attorney, Agent, or Firm — Hauptman Ham, LLP

(57) ABSTRACT

Glasses with gesture recognition function include a glasses frame and a gesture recognition system. The gesture recognition system is disposed on the glasses frame and configured to detect hand gestures in front of the glasses thereby generating a control command. The gesture recognition system transmits the control command to an electronic device to correspondingly control the electronic device.

20 Claims, 4 Drawing Sheets

(56) References Cited

U.S. PATENT DOCUMENTS

| | | | |
|---|---|---|---|
| 8,836,768 B1* | 9/2014 | Rafii | G06F 3/017 345/420 |
| 9,116,614 B1* | 8/2015 | de los Reyes | G06F 3/04883 |
| 9,164,588 B1* | 10/2015 | Johnson | G06F 3/017 |
| 9,239,626 B1* | 1/2016 | Wu | G06F 3/017 |
| 2006/0183545 A1* | 8/2006 | Jourdian | A63F 7/06 463/36 |
| 2007/0052672 A1 | 3/2007 | Ritter et al. | |
| 2008/0107303 A1* | 5/2008 | Kim | G06F 3/017 382/103 |
| 2009/0128516 A1* | 5/2009 | Rimon | G06F 3/0412 345/174 |
| 2009/0135162 A1* | 5/2009 | Van De Wijdeven | G06F 3/0421 345/175 |
| 2009/0153288 A1* | 6/2009 | Hope | G06F 3/0482 340/3.1 |
| 2009/0266623 A1 | 10/2009 | Wang et al. | |
| 2010/0156804 A1* | 6/2010 | Young | G06F 3/0416 345/173 |
| 2011/0018795 A1* | 1/2011 | Jang | G06F 3/0304 345/156 |
| 2011/0025976 A1* | 2/2011 | Reichow | A61B 3/032 351/201 |
| 2011/0052007 A1 | 3/2011 | Chen et al. | |
| 2011/0055753 A1* | 3/2011 | Horodezky | G06F 3/04883 715/810 |
| 2011/0274311 A1* | 11/2011 | Lee | G06K 9/00 382/100 |
| 2011/0279397 A1* | 11/2011 | Rimon | G06F 3/044 345/173 |
| 2011/0310005 A1* | 12/2011 | Chen | G06F 1/3203 345/156 |
| 2012/0206419 A1* | 8/2012 | Lee | G06F 3/012 345/179 |
| 2012/0212593 A1* | 8/2012 | Na'aman | G06K 9/00671 348/62 |
| 2012/0224456 A1* | 9/2012 | Visser | G01S 3/8006 367/127 |
| 2012/0249741 A1* | 10/2012 | Maciocci | G06F 3/011 348/46 |
| 2013/0021491 A1* | 1/2013 | Lee | H04N 19/56 348/222.1 |
| 2013/0050069 A1* | 2/2013 | Ota | G06F 3/011 345/156 |
| 2013/0050070 A1* | 2/2013 | Lewis | A61B 3/113 345/156 |
| 2013/0083018 A1* | 4/2013 | Geisner | G06F 3/011 345/420 |
| 2013/0100140 A1* | 4/2013 | Ye | G06T 13/20 345/473 |
| 2013/0120238 A1* | 5/2013 | Spaulding | H05B 37/0227 345/156 |
| 2013/0162582 A1* | 6/2013 | Hatano | B60K 37/06 345/173 |
| 2013/0196757 A1* | 8/2013 | Latta | A63F 13/211 463/31 |
| 2013/0265229 A1* | 10/2013 | Forutanpour | G06F 3/014 345/158 |
| 2013/0286163 A1* | 10/2013 | Dror | H04N 13/332 348/53 |
| 2013/0335573 A1* | 12/2013 | Forutanpour | G06F 3/011 348/158 |
| 2014/0002492 A1* | 1/2014 | Lamb | G06F 1/163 345/633 |
| 2014/0019253 A1* | 1/2014 | Ricasata | G06Q 30/0241 705/14.64 |
| 2014/0084134 A1* | 3/2014 | Chen | G02B 5/28 250/206.1 |
| 2014/0125810 A1* | 5/2014 | D'Amico | H04N 5/2258 348/164 |
| 2015/0161521 A1* | 6/2015 | Shah | G06F 3/0481 706/12 |

FOREIGN PATENT DOCUMENTS

| | | |
|---|---|---|
| CN | 101890719 A | 11/2010 |
| CN | 102348068 A | 2/2012 |
| CN | 102547172 A | 7/2012 |
| TW | 200945775 A | 11/2009 |
| TW | 201012513 A | 4/2010 |
| TW | 201109998 A | 3/2011 |
| TW | 201132107 A | 9/2011 |
| TW | 201135527 A | 10/2011 |
| TW | 201201567 A1 | 1/2012 |
| TW | 201205339 A | 2/2012 |
| TW | 201209694 A | 3/2012 |
| TW | 201216090 A | 4/2012 |
| TW | 201227575 A1 | 7/2012 |

* cited by examiner

INTERACTIVE SYSTEM AND GLASSES WITH GESTURE RECOGNITION FUNCTION

CROSS REFERENCE TO RELATED APPLICATION

This application is a continuation application of U.S. patent application Ser. No. 13/929,061 filed on, Jun. 27, 2013, which claims the priority benefit of Taiwan Patent Application Serial Number 101124573, filed on Jul. 6, 2012, the full disclosure of which is incorporated herein by reference.

BACKGROUND

1. Field of the Disclosure

This disclosure generally relates to eyeglasses and, more particularly, to glasses with gesture recognition function.

2. Description of the Related Art

With the vigorous development of the smartphone technology, the sensitivity and smoothness of the touch panel are also improved for being operated and used on the users' cell phones. More and more control gestures have been provided such as moving the thumb closer to or farther away the index finger to perform zoom-in and zoom-out functions, or moving the finger rightward to perform a page-turning command. However, the gesture recognition methods mentioned above are all performed through a touch panel.

In the present day, the optical gesture recognition has been developed quickly due to the vigorous development of the multimedia technology. For example, a user can control a smart TV to switch channel or adjust volume by using hand gestures. However, current gesture recognition devices are integrated with the electronic device and the gesture recognition is performed by means of optical sensing such that the operating distance is limited, e.g. the technology disclosed in the U.S. Pat. No. 5,594,469.

SUMMARY

The present disclosure provides a gesture recognition system that has a wireless transmission unit configured to transmit the control command to an electronic device at a distance therefrom.

The present disclosure further provides glasses that include the above gesture recognition system so as to control the electronic device at a distance therefrom.

Other objects and advantages of the present disclosure will become more apparent from the technical features of the present disclosure.

To achieve one, a part of or all objects above or other objects, one embodiment of the present disclosure provides glasses including a glasses frame and a gesture recognition system. The glasses frame includes a left lens frame, a right lens frame and a connecting part connecting between the left lens frame and the right lens frame, wherein the connecting part has a constant width region. The gesture recognition system is embedded inside the constant width region of the connecting part of the glasses frame and includes an illumination device and an image sensor. The illumination device and the image sensor are disposed inside the constant width region of the connecting part, wherein the constant width region connects the right and left lens frames along a transverse direction, and the illumination device and the image sensor are disposed adjacent to each other along a direction parallel to the transverse direction inside the constant width region of the connecting part.

In one aspect, the gesture recognition system is not integrated with the electronic device.

In one aspect, the control command may be an ON/OFF command, a zooming command, a page-turning command, a volume command or a channel-selection command.

In one aspect, the motion track of the object may be an upward track, a downward track, a leftward track, a rightward track, a forward track, a backward track or a rotation track.

In one aspect, the gesture recognition system further includes an illumination device configured to provide a light beam, wherein the images captured by the image sensor are formed by capturing reflection of the light beam reflected from the object.

The present disclosure further provides glasses including a glasses frame and a gesture recognition system. The gesture recognition system is disposed on the glasses frame. The gesture recognition system includes an image sensor, a processor and a transmission unit. The image sensor is configured to capture a plurality of images containing a motion track of an object. The processor is configured to process the images and recognize the motion track of the object thereby generating a control command. The transmission unit is configured to transmit the control command to an electronic device to correspondingly control the electronic device.

In one aspect, the gesture recognition system may be integrated on a connecting part of the glasses frame.

In one aspect, the gesture recognition system may be integrated on a temple arm of the glasses frame.

The present disclosure further provides an interactive system including glasses and an electronic device. The glasses include a glasses frame and a gesture recognition system. The glasses frame includes a left lens frame, a right lens frame and a connecting part connecting between the left lens frame and the right lens frame, wherein the connecting part has a constant width region. The gesture recognition system is embedded inside the constant width region of the connecting part of the glasses frame and wirelessly coupled with the electronic device. The gesture recognition system includes an illumination device, an image sensor, a processor and a transmission unit. The illumination device is disposed inside the constant width region of the connecting part. The image sensor is disposed inside the constant width region of the connecting part and configured to capture images. The constant width region connects the right and left lens frames along a transverse direction, and the illumination device and the image sensor are disposed adjacent to each other along a direction parallel to the transverse direction inside the constant width region of the connecting part. The processor is configured to recognize motion track of an object according to the captured images to generate a control command. The transmission unit is configured to transmit the control command to the electronic device to correspondingly control the electronic device.

In one aspect, the at least one display unit may be at least one of a left lens and a right lens. In one aspect, the left lens or the right lens includes an OLED (organic light emitting diode) display panel.

As mentioned above, the gesture recognition system of the present disclosure includes a wireless transmission unit so that the gesture recognition system has an operating distance. As the gesture recognition system may be disposed on the glasses or other portable devices, e.g. a Bluetooth earphone, a cell phone or a tablet computer, it may be placed close to the user all the time. The control command may be transmitted to the electronic device to be controlled through the wireless communication unit of the gesture recognition system to significantly extend the operating distance compared to traditional systems. In addition, the gesture recognition system may be disposed at different positions of the glasses so as to improve the gesture operation. For example, the gesture recognition system may be disposed at the connecting part or the periphery of edges so that the gesture operation may have a lower chance to block the line of sight. Furthermore, if the pair of glasses itself includes the display unit for displaying images, the gesture recognition system may not include the wireless transmission unit; i.e. the control command generated by the processor may be directly transmitted to the display unit to correspondingly control the content shown on the glasses.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

The above or other technical contents, characteristics and effects according to the present disclosure will become more apparent from the following detailed description of a preferred embodiment in conjunction with the accompanying drawings. It is to be understood that terms of direction used herein, such as upward, downward, leftward, rightward, forward and backward, are only used for reference but not used to limit the present disclosure.

Figure 1:
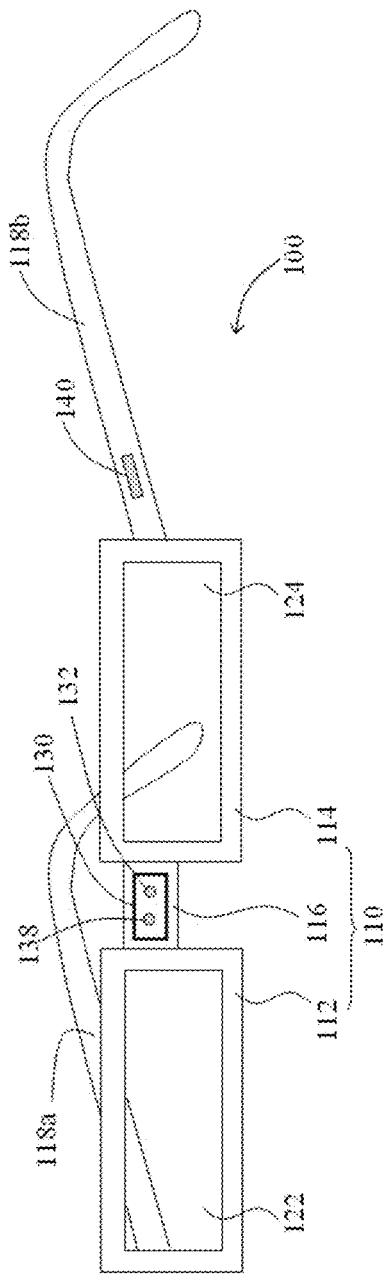
FIG. 1 shows a schematic diagram of the glasses with gesture recognition function according to an embodiment of the present disclosure.

FIG. 1 shows a schematic diagram of the glasses with gesture recognition function according to an embodiment of the present disclosure. Referring to FIG. 1, the glasses with gesture recognition function 100 of this embodiment includes a glasses frame 110, wherein a left lens 122 and a right lens 124 may be embedded in the glasses frame 110. Specifically speaking, the glasses frame 110 includes a left lens frame 112, a right lens frame 114, a connecting part 116, a left temple arm 118a and a right temple arm 118b. The connecting part 116 is configured to connect the left lens frame 112 and the right lens frame 114. The left temple arm 118a is connected to the left lens frame 112 and the right temple arm 118b is connected to the right lens frame 114, wherein the left and right temple arms 118a, 118b are used to support and fix the glasses 100 on two sides of a user's head.

Figure 3:
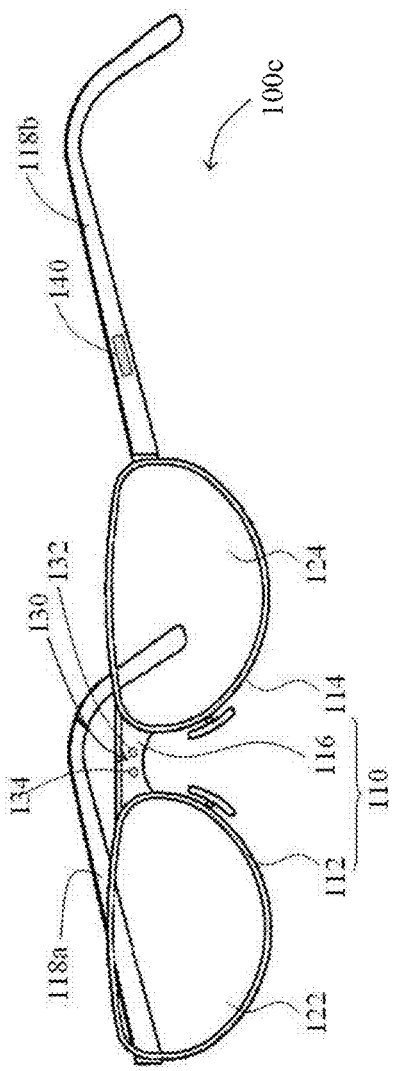
FIG. 3 shows a schematic diagram of the glasses with partially integrated structure.

In one embodiment, the glasses frame 110 may have an integrated structure; i.e. the left lens frame 112, the right lens frame 114, the connecting part 116 and the left and right temple arms 118a, 118b are formed integrally. The glasses frame 110 of this embodiment is described with an example having a partially integrated structure; i.e. only the left lens frame 112, the right lens frame 114 and the connecting part 116 are formed integrally as shown by the glasses 100 in FIG. 3, but the present disclosure is not limited thereto.

Referring to FIG. 1, the glasses 110 of this embodiment further include a gesture recognition system 130, wherein the gesture recognition system 130 may be disposed on or in the glasses frame 110. For example, the gesture recognition system 130 may be disposed on the connecting part 116 of the glasses frame 110, wherein an example of the gesture recognition system 130 in this embodiment may be embedded in the connecting part 116. In another embodiment, a part of the gesture recognition system 130 may be embedded in the lens frames 112, 114 or the temple arms 118a, 118b and the rest part thereof is exposed outside the lens frames 112, 114 or the temple arms 118a, 118b. In this manner, the hand waving of a user may not be performed in front of the user and the hand waving may be performed at the left-front or right-front of the user in order not to block the line of sight. In another embodiment, the gesture recognition system 130 may also be hung on the glasses 100 such that users with myopia may directly hang the gesture recognition system 130 on their glasses without using an additional pair of glasses.

Figure 2:
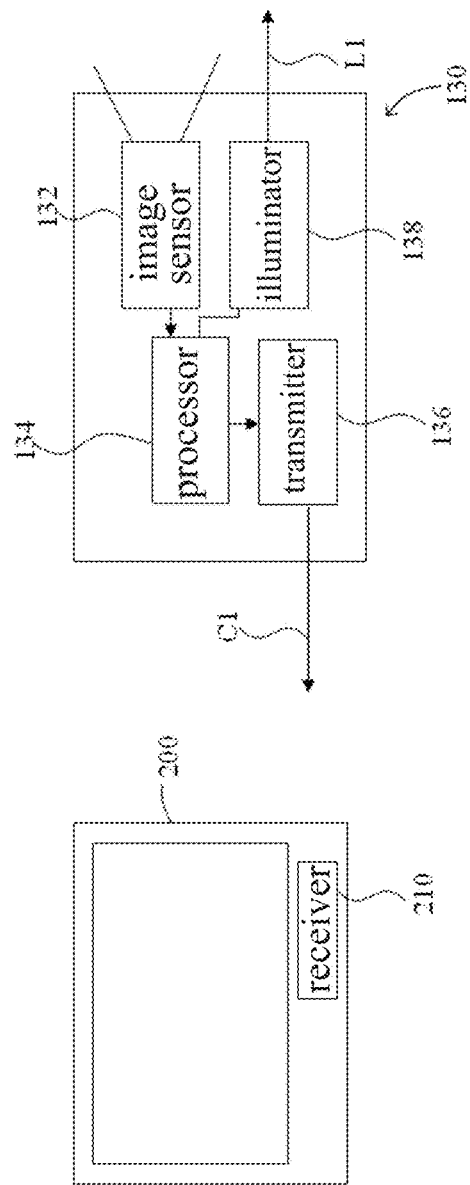
FIG. 2 shows a schematic block diagram of the gesture recognition system shown in FIG. 1.

In this embodiment, the gesture recognition system 130 may include an image sensor 132 and a processor 134, wherein the image sensor 132 is configured to successively capture images that contain a motion track of the user's hand, and the processor 134 is configured to receive the images and generate a control command C1 according to the motion track of the user's hand as shown in FIGS. 1 and 2, wherein FIG. 2 is a schematic block diagram of the gesture recognition system 130 of FIG. 1.

In one embodiment, the gesture recognition system 130 may include a transmission unit 136 configured to transmit the control command C1 to an electronic device 200 to correspondingly control the electronic device 200, e.g. controlling the ON/OFF of the electronic device 200, zoom-in or zoom-out of the screen information shown on the electronic device 200, the cursor shown on the screen of the electronic device 200, or the page-turning command of the screen information shown on the electronic device 200. In other words, the control command C1 may be an ON/OFF command, a zoom-in or zoom-out command, a command turning to a previous page or a next page, a volume command or a channel-selection command.

In this embodiment, the electronic device 200 may be a display device (e.g. a TV or a monitor), a portable electronic device (e.g. a cell phone or a tablet computer), home appliance or a vehicle electronic device. More particularly, the electronic device 200 preferably includes a receiving unit 210 configured to receive the control command C1. In other words, the glasses 100 of this embodiment may wirelessly transmit the control command C1 to the electronic device 200 to accordingly control the electronic device 200. In this manner, it is able to provide control on the electronic device 200 at a distance therefrom without being limited by a far distance between the user and the electronic device to avoid the condition that the gesture recognition system is unable to detect gestures of the user's hand. It should be mentioned that, in some cases, the user may not want to use the wireless communication due to the electromagnetic radiation and the gesture recognition unit 130 of the glasses 100 may be connected to the electronic device 200 via a cable in another embodiment.

In addition, in order to improve the performance of recognizing the hand motion, the gesture recognition system 130 may further include an illumination device 138, wherein the illumination device 138 is configured to provide a light beam L1 and the image sensor 132 is configured to receive reflection of the light beam L1 reflected from the hand motion of the user and to generate a plurality of images. Similarly, the processor 134 is configured to receive the images and generate the control command C1 mentioned above according to the motion track of the user's hand. In this embodiment, the illumination device 138 may be one capable of providing infrared light, whereas the image sensor 132 may be one capable of sensing infrared light, wherein as there is generally no object between the hand motion of the user and the glasses 100, the gesture recognition system 130 on the glasses 100 is able to recognize the motion track of the user's hand correctly.

In one embodiment, the glasses 100 may further include a switch device 140, wherein the switch device 140 may be disposed on the glasses frame 110 as shown in FIG. 1. Specifically speaking, the switch device 140 may be configured to turn on or turn off the gesture recognition system 130 so as to effectively reduce the power consumption as well as prevent recognition error.

Figure 5:
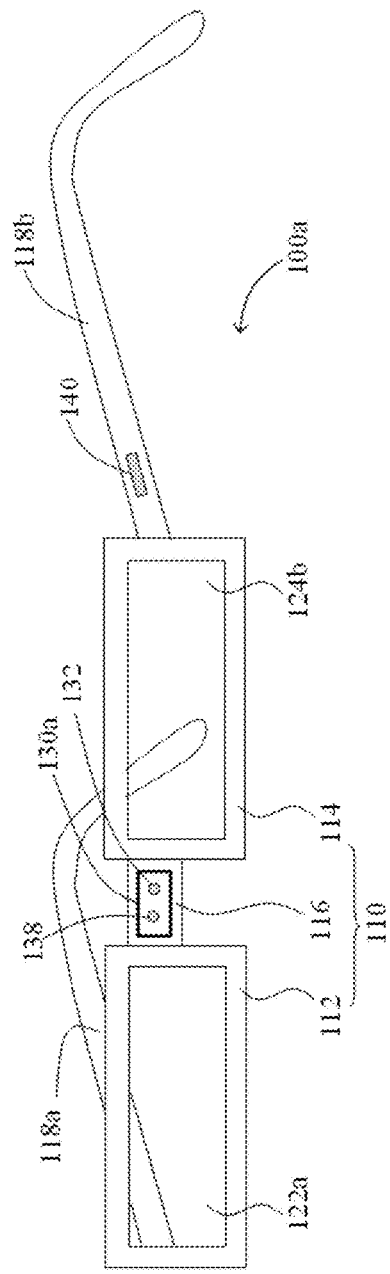
FIGS. 5 and 6 show schematic diagrams of the glasses and gesture recognition system thereof according to another embodiment of the present disclosure.
Figure 6:
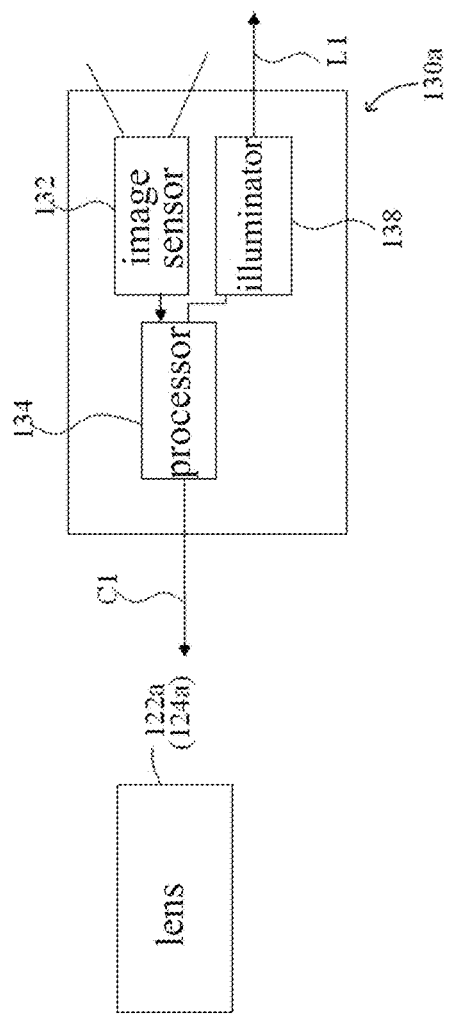

In addition, the glasses 100 of this embodiment may or may not be embedded with the lens 122, 124 according to the preference of the user. In one embodiment, the left and right lens 122, 124 in the glasses frame 110 of the glasses 100 may be corrective lenses, plain glass lenses or lens capable of displaying images, wherein the lens capable of displaying images may include OLED display panel having high transparency as shown by the glasses 100a and gesture recognition system 130a thereof in FIGS. 5 and 6. Specifically speaking, as the lens 122a, 124b of the glasses 110a may directly display images, the wireless transmission unit 136 mentioned above may not be implemented in the gesture recognition system 130a and the processor 134 may directly transmit the control command C1 to the lens 122a, 124a to directly control the content shown on the lens 122a, 124a.

Figure 7:
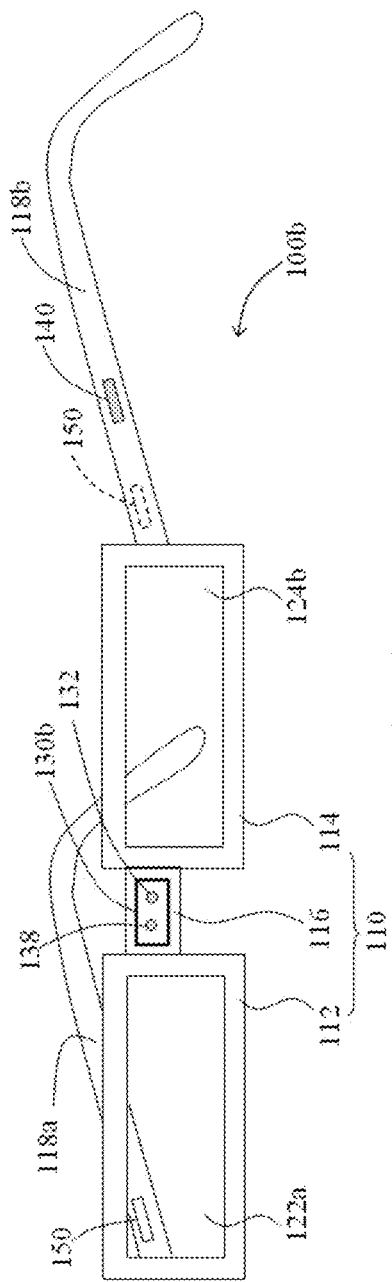
FIGS. 7 and 8 show schematic diagrams of the glasses and gesture recognition system thereof according to an alternative embodiment of the present disclosure.
Figure 8:
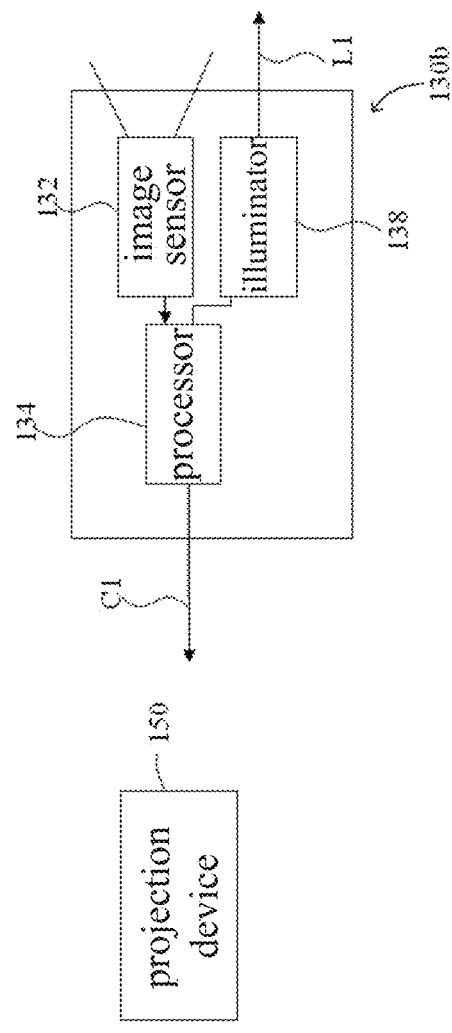

In another embodiment, the content shown on the lens may also be formed by projection; i.e. the glasses 100b may further include a projection device 150, wherein the projection device 150 may directly project images onto the lens 122, 124 as shown by the glasses 100a and gesture recognition system 130b thereof in FIGS. 7 and 8. Similarly, as the lens 122, 124 of the glasses 100b may directly show images through projection, the wireless transmission unit 136 may not be implemented in the gesture recognition system 130a and the processor 134 may directly transmit the control command C1 to the projection device 150 to directly control the content projected on the lens 122, 124.

Figure 4:
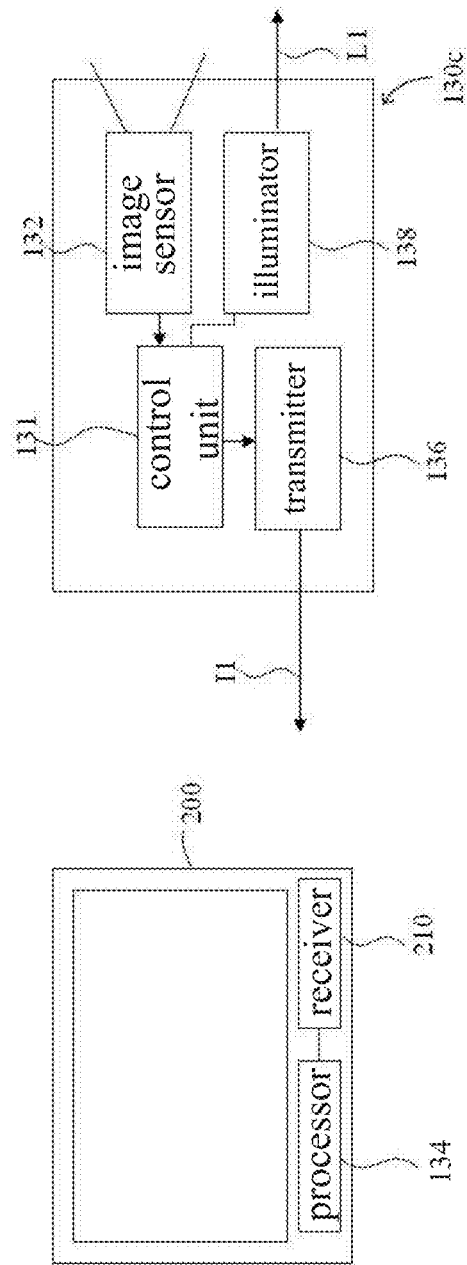
FIG. 4 shows a schematic diagram of the gesture recognition system in which the processor is integrated with an electronic device.

It should be mentioned that the gesture recognition systems 130, 130a and 130b generate the aforementioned control command by using their own processor 134 to process the gesture images received. In one embodiment, the processor 134 may be integrated with the electronic device 200; i.e. the gesture recognition system 130c may utilize a control unit 131 to transmit the captured image data I1 to the electronic device 200 through the transmission unit 136 and the processor 134 of the electronic device 200 processes the image data to generate the control command C1 mentioned above as shown in FIG. 4, wherein FIG. 4 shows a schematic diagram of the gesture recognition system in which the processor is integrated with the electronic device 200.

As mentioned above, the gesture recognition system and the glasses with gesture recognition function according to the embodiment of the present disclosure have at least following advantages. First, the gesture recognition system has a wireless transmission unit so that the gesture recognition system has an operating distance from the devices to be controlled. As the gesture recognition system may be disposed on the glasses or other portable devices, e.g. a Bluetooth earphone, a cell phone or a tablet computer, it may be placed close to the user all the time. The control command may be transmitted to the electronic device to be controlled through the wireless communication unit of the gesture recognition system to significantly extend the operating distance compared to traditional systems.

In addition, the gesture recognition system may be located at different positions of the glasses so as to improve the gesture operation. For example, the gesture recognition system may be disposed at the connecting part or the periphery of edges so that the gesture operation may have a lower chance to block the line of sight. Furthermore, if the glasses have the display unit for displaying images, the gesture recognition system may not include the wireless transmission unit; i.e. the control command generated by the processor may be directly transmitted to the display unit to accordingly control the content shown on the glasses.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed. Furthermore, any embodiment or claim of the present invention is not necessary to achieve all objects, advantages, and novel features disclosed herein. Meanwhile, the summary and title are only for searching of patent documents but not to limit the disclosure.

What is claimed is:

1. Glasses, comprising:
   a glasses frame comprising a left lens frame, a right lens frame and a connecting part connecting between the left lens frame and the right lens frame, wherein the connecting part has a constant width region; and
   a gesture recognition system embedded inside the constant width region of the connecting part of the glasses frame, the gesture recognition system comprising:
   an illumination device disposed inside the constant width region of the connecting part; and
   an image sensor disposed inside the constant width region of the connecting part,
   wherein the constant width region connects the right and left lens frames along a transverse direction, and the illumination device and the image sensor are disposed adjacent to each other along a direction parallel to the transverse direction inside the constant width region of the connecting part.

2. The glasses as claimed in claim 1, wherein the constant width region connects only a part of adjacent edges of the right and left lens frames.

3. The glasses as claimed in claim 1, wherein the left lens frame, the right lens frame and the connecting part are formed integrally.

4. The glasses as claimed in claim 1, wherein the constant width region has a width smaller than a height of the right and left lens frames.

5. The glasses as claimed in claim 1, wherein the illumination device is configured to emit infrared light.

6. The glasses as claimed in claim 1, wherein the glasses frame further comprises a left temple arm and a right temple arm respectively connected to the left lens frame and the right lens frame.

7. The glasses as claimed in claim 6, further comprising a switch device arranged on the left temple arm or the right temple arm, and configured to turn on or turn off the gesture recognition system.

8. The glasses as claimed in claim 1, further comprising two lenses each having an OLED display panel.

9. An interactive system, comprising:
an electronic device; and
glasses, comprising:
  a glasses frame comprising a left lens frame, a right lens frame and a connecting part connecting between the left lens frame and the right lens frame, wherein the connecting part has a constant width region; and
  a gesture recognition system embedded inside the constant width region of the connecting part of the glasses frame and wirelessly coupled with the electronic device, the gesture recognition system comprising:
    an illumination device disposed inside the constant width region of the connecting part;
    an image sensor disposed inside the constant width region of the connecting part and configured to capture images,
    wherein the constant width region connects the right and left lens frames along a transverse direction, and the illumination device and the image sensor are disposed adjacent to each other along a direction parallel to the transverse direction inside the constant width region of the connecting part;
    a processor configured to recognize motion track of an object according to the captured images to generate a control command; and
    a transmission unit configured to transmit the control command to the electronic device to correspondingly control the electronic device.

10. The interactive system as claimed in claim 9, wherein the electronic device comprises a display.

11. The interactive system as claimed in claim 9, wherein the control command comprises an ON/OFF command, a zooming command, a page-turning command, a volume command and a channel-selection command.

12. The interactive system as claimed in claim 9, wherein the motion track comprises an upward track, a downward track, a leftward track, a rightward track, a forward track, a backward track and a rotation track of the object.

13. The interactive system as claimed in claim 9, wherein the constant width region connects only a part of adjacent edges of the right and left lens frames.

14. The interactive system as claimed in claim 9, wherein the left lens frame, the right lens frame and the connecting part are formed integrally.

15. The interactive system as claimed in claim 9, wherein the constant width region has a width smaller than a height of the right and left lens frames.

16. The interactive system as claimed in claim 9, wherein the glasses further comprises two lenses each having an OLED display panel.

17. The interactive system as claimed in claim 9, wherein the glasses further comprises a left temple arm and a right temple arm respectively connected to the left lens frame and the right lens frame.

18. The interactive system as claimed in claim 17, wherein the glasses further comprises a switch device arranged on the left temple arm or the right temple arm, and configured to turn on or turn off the gesture recognition system.

19. The interactive system as claimed in claim 9, wherein the illumination device is configured to emit infrared light.

20. The glasses as claimed in claim 1, further comprising a transmission unit configured to transmit image data captured by the image sensor.

* * * * *